United States Patent [19]

Kurz

[11] 4,395,673
[45] Jul. 26, 1983

[54] CONTROLLED RECTIFIER MOTOR VEHICLE BATTERY CHARGER

[75] Inventor: Wolfgang Kurz, Hemmingen, Fed. Rep. of Germany

[73] Assignee: Robert Bosch GmbH, Fed. Rep. of Germany

[21] Appl. No.: 259,555

[22] Filed: May 1, 1981

[30] Foreign Application Priority Data

May 2, 1980 [DE] Fed. Rep. of Germany ....... 3016955

[51] Int. Cl.³ .............................................. H02J 7/14
[52] U.S. Cl. .................................... 320/61; 363/129; 320/60
[58] Field of Search .................... 320/2, 39, 61, 49, 57, 320/60, 64, 65, 68; 363/129

[56] References Cited

U.S. PATENT DOCUMENTS 3,543,128. 11/1970 Roda et al. ....................... 320/39 X
3,584,286 6/1971 Randall ............................... 363/129
3,621,373 11/1971 Mitchell et al. ................. 363/129 X Primary Examiner—A. D. Pellinen
Attorney, Agent, or Firm—Frishauf, Holtz, Goodman & Woodward

[57] ABSTRACT

A conventional on-off voltage regulator responsive to the output voltage of the rectifier of a vehicular battery charging system, operates three circuits each containing a pulse transformer and its driving transistor and other components for controlling the three SCRs that provide the negative side of the rectifier bridge, so that they will either pass entire halfwaves or block completely. The other three rectifier elements of the bridge are ordinary diodes. With this arrangement the SCRs may have the same rating as the other diodes of the bridge, and the thermal load is evenly distributed, while an alternator having a permanent magnet field can be used.

1 Claim, 1 Drawing Figure

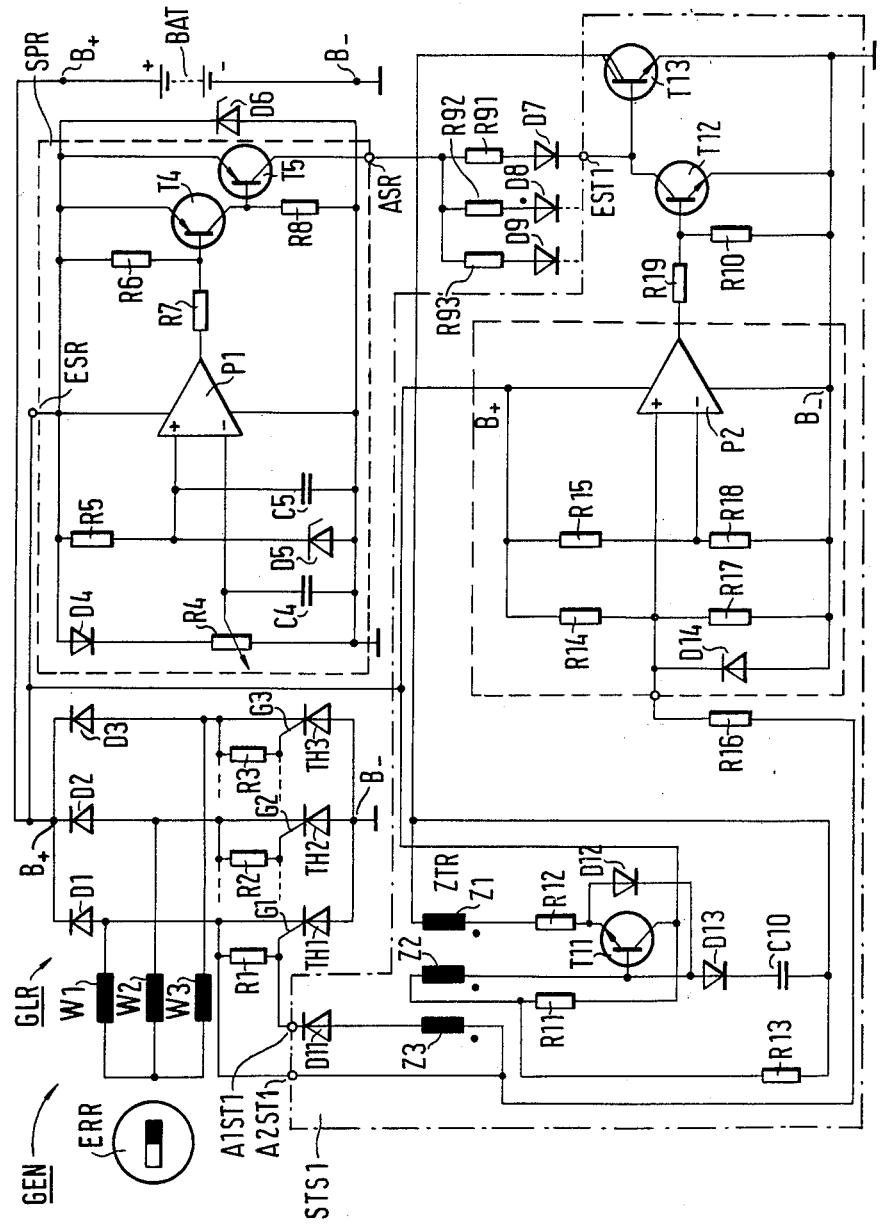

CONTROLLED RECTIFIER MOTOR VEHICLE BATTERY CHARGER

Battery charging systems have long been known which contain a voltage regulator that controls the current through the exciter winding of an engine driven generator in order to keep the charging voltage constant. In the case of permanent magnet generators, because of the necessarily constant excitation, the output voltage of the generator must be differently regulated, and this can be done either by shunt or series regulation.

Systems are known in which the bridge rectifier connected to an alternator is "half-controlled" by having only a part of the rectifiers, typically one-half of the bridge, constituted as semiconductor controlled rectifiers, known for short as SCR's or "thyristors".

Heretofore, it was conventional either to utilize a complicated and expensive phase-chop control or else to control all rectifiers of the bridge at once in so-called "oscillation unit" control which in most cases led to an unsymmetrical loading of the windings of the generator. In consequence, the controlled rectifiers were unevenly loaded thermally.

THE INVENTION

It is an object of the invention to provide series regulation on a half-controlled bridge rectifier fed by an alternator, in a manner that will not unevenly load the controlled rectifier elements, that will not necessitate the use of oversized rectifier elements and which is capable of reliable operation and easy maintenance.

Briefly, a conventional electronic voltage regulator is used, and its output is provided to the control input of a control circuit which switches the control paths of the controlled rectifier elements so as either to pass or block complete halfwaves of alternating frequency. The controlled circuits are made of several similar subcircuits each controlling an individual controlled rectifier element.

The battery charging system of the invention, by providing for admitting through the controlled rectifier elements only complete current halfwaves makes possible a firing of the controlled rectifiers that is correct in phase, thus assuring that unsymmetrical loading of the generator will be prevented. Since in the case of the individual controlled rectifiers, on the one hand only the conditions of "on" and "off" have to be distinguished and, on the other hand, the thermal loading is evenly distributed, these devices do not have to be made larger or of higher power rating than the normal rectifier diodes forming the rest of the bridge.

In particular, it is useful to utilize a pulse transformer in the firing circuit of each controlled rectifier, driven by a firing transistor, in order to provide a steeply rising ignition pulse, while a switching transistor is provided having its switching path between the switching path of the ignition transistor and the negative pole of the rectifier, and having its control electrode connected to the control output of the voltage regulator. It is also preferred to provide a Schmitt trigger in the control circuit for each controlled rectifier having its input connected with the corresponding phase winding of the generator and its output also provided to the control input of the switching transistor just mentioned.

THE DRAWING

The invention is further described by way of illustrative example with reference to the annexed drawing, the single FIGURE of which shows a circuit diagram of a battery charging system according to the invention.

DESCRIPTION OF THE ILLUSTRATED EMBODIMENT

A permanent magnet generator GEN comprises a permanent magnet rotor ERR and phase windings W1, W2 and W3. The phase windings are connected to a bridge rectifier GLR comprising normal rectifier elements ("valves") D1, D2, D3 operating as positive diodes and thyristors TH1, TH2, TH3 operating as negative diodes. The cathodes of the positive diodes D1, D2, D3 are connected to the positive terminal B+ and the anodes of the thyristors TH1, TH2, TH3 are connected to the negative terminal B− of the rectifier GLR. The control path of each thyristor, which extends from the gate terminal G1, G2, G3 and the corresponding cathode is bridged by a leak resistor R1, R2, R3.

A voltage regulator SPR of conventional construction is connected to the output of the rectifier GLR, in parallel with the battery BAT which is being charged. The input ESR of the voltage regulator SPR is connected to the positive output B+ of the rectifier GLR. The voltage regulator SPR comprises an input voltage divider made up of a diode D4 and a potentiometer R4 and also a differential amplifier P1. The inverting input of the differential amplifier P1 is connected to the slider of the potentiometer R4 and filtered by a capacitor C4. The non-inverting input of the differential amplifier P1 is filtered with a capacitor C5 and connected to a voltage divider consisting of a resistance R5 and a Zener diode D5. A voltage divider consisting of the resistors R6 and R7 is provided at the output of the differential amplifier P1. The tap of this voltage divider R6,R7 is connected to the control terminal of a cascade of switching transistors T4,T5. The output of the switching path of the switching transistors T4,T5 is connected to the control output ASR of the voltage regulator SPR. A Zener diode D6 is connected between the input ESR of the voltage regulator SPR and the negative terminal B−.

Each of the thyristors is provided with an individual control circuit STS, only one of which, STS1, serving the thyristor TH1, is illustrated in the drawing. When the battery charging system utilizes a three-phase alternator for the generator GEN as in this case, followed by a three-phase bridge rectifier GLR, three control circuits STS1,STS2,STS3 are provided respectively for the three thyristors TH1,TH2,TH3. These three circuits are really identical subcircuits of a combined control circuit for the rectifier and will hereafter be referred to as control subcircuits. Their respective inputs EST1, EST2, EST3 are provided with respective decoupling means D7, R91; D8, D92; D9, R93 which have a common connection to the control output ASR of the voltage regulator SPR.

The control subcircuit STS1, which as mentioned is the only one of the identical subcircuits of a control circuit STS which is shown in detail, comprises a pulse transformer ZTR connected to an ignition transistor T11 in a known pulse forming circuit. The ends of the output winding Z3 of the pulse transformer lead to the output terminals A1ST1 and A2ST1 of the control subcircuit STS1, the terminal A1ST1 being connected through the diode D11. These output terminals of the control subcircuit are connected to the ends of the switching path of the thyristor TH1, namely to the gate terminal G1 and the cathode. The pulse transformer ZTR also comprises in a known way the two windings Z1 and Z2. Its driving transistor T11 is connected, as is conventional, with resistors R11, R12, R13, diodes D12, D13 and a capacitor C10. The winding Z1 of the pulse transformer, the resistor R13 and the capacitor C10 each have one terminal connected to the "cold" end of the pulse-forming circuit, which circuit may be referred to as the firing circuit for the controlled rectifier.

The controlled subcircuit STS1 also comprises a switching transistor T13 that is advantageously provided as a Darlington transistor. The emitter of the switching transistor T13 is connected to the terminal B— of the battery charging system, its base to the input EST1 of the control subcircuit STS1, and its collector to the abovementioned "cold" end of the firing circuit.

The control subcircuit STS1 further comprises a Schmitt trigger device P2, the inverting input of which is connected to the tap of a voltage divider formed by the resistors R15 and R18, while its non-inverting input is connected to the tap of a voltage divider formed by the resistors R14 and R17. The two voltage dividers just mentioned are connected between the positive output terminal B+ and the negative output terminal B— of the rectifier GLR. The non-inverting input of the Schmitt trigger P2 is so connected that only negative halfwaves of the corresponding phase of the alternator are accepted, this being assured by means of a diode D14 having one terminal connected to the negative terminal B—. The switching diode D14 is connected through an input resistor R16 to the potential of the cathode of the thyristor TH1 and thereby directly to the corresponding phase winding W1. The output of the Schmitt trigger P2, operating through the network consisting of the resistors R19 and R10, controls the control transistor T12 at its base, which then controls the switching transistor T13 at the base of the latter. The three thyristors TH1, TH2 and TH3 provide series regulation for the charging voltage for the battery BAT. Thus, in a conventional six-diode rectifier working with a conventional voltage regulator, all that is needed to constitute a system according to the invention is to replace the usual diodes serving as negative diodes in the rectifier by the thyristors TH1, TH2, TH3 and to provide the control circuits for the latter operating from the output of the voltage regulator. The thyristors then serve simultaneously for rectification and as control elements or valves for the regulation.

The voltage regulator SPR is a two-position (two-state) regulator utilizing comparison of actual and reference values and having a hysteresis behavior. In accordance with the output voltage of the generator GEN and the values set into the potentiometer R4, the switching state of the switching transistor T5 is changed from time to time. At output voltages that lie below a predetermined value, the output potential of the differential amplifier P1 is substantially equal to the output potential of the rectifier GLR. Consequently, the control transistor T4 is blocked, and the switching transistor T5 is conducting.

If now in operation of the generator GEN the voltage between anode and cathode of one of the thyristors TH1, TH2, TH3, after the passage of the voltage through zero becomes greater than zero, the output voltage of the Schmitt trigger P2 of the corresponding control subcircuit, for example the subcircuit STS1, drops from the value of the potential at the positive terminal B+ down to zero, which is to say to the value of the potential at the negative terminal B—. The switching path of the control transistor T12 then goes from the conducting into the non-conducting condition. The base of the switching transistor T13 is thereafter controllable only by the potential at the input terminal EST1 of the control subcircuit STS1. While the switching transistor T5 of the voltage regulator SPR1 continues to conduct, the switching transistor T13 of the control subcircuit STS1 is likewise conducting. Its switching path puts the cold end of the firing circuit containing the pulse transformer ZTR and the driving transistor T11 at the potential of the negative terminal B—.

The firing circuit containing the pulse transformer ZTR and its driving transistor T11 is a known blocking converter circuit for generating the firing pulse for the thyristor TH1. The pulse transformer is required because of the high pulse edge steepness necessary for the firing pulse. The use of the pulse transformer makes possible at the same time the galvanic decoupling of the cathode voltage of the thyristor TH1 which, depending upon the generator speed, can go to very high values.

As soon as the switching path of the switching transistor T13 becomes conducting and the firing circuit is put at the potential B—, the firing circuit operates and the thyristor TH1 is ignited. All rectifier elements of the rectifier circuit GLR become conducting in accordance with the phase sequence. The output voltage of the generator GEN rises and continues rising until the prescribed reference value is reached. Then the differential amplifier P1 switches the switching transistor T5 of the voltage regulator SPR into the non-conducting condition and the switching transistor T13 of the control subcircuit STS1 thereby is made controllable only by the control transistor T12. The firing circuit containing the pulse transformer ZTR is no longer operative. After the next passage through zero of the phase voltage of the winding W1, the thyristor TH1 is no longer ignited. Thereafter, the thyristors TH2 and TH3 are in turn extinguished.

The use of a pulse transformer brings along the advantage that the firing pulses have a great steepness of their leading edges and hence the loading of the thyristors with power dissipation is still smaller. Thyristors of veryysmall size and power rating can therefore be utilized. The control of the thyristors and the voltage regulation, even at the greatest operating speeds of the rotor of the generator, has a good overall precision. Lamps connected to the charging circuit shine without flicker.

Although the invention has been described with reference to a particular illustrative example, it will be understood that modifications and variations are possible within the inventive concept.

I claim:

1. A three-phase a.c. generator and rectifier unit for a motor vehicle comprising a rotor having at least one permanent magnet for generator excitation, a stator having three windings (W1,W2,W3) for alternating current excited by said at least one magnet, diodes (D1,D2,D3) respectively connecting ends of said stator windings with one pole of a storage battery, three semiconductor controlled rectifiers (TH1, TH2, TH3) respectively connecting the same ends of said windings to the other pole of said storage battery, a voltage regulator (SPR) having an on-off d.c. output, and three control circuits for respectively controlling, without the use or interposition of any oscillator circuit, said semiconductor controlled rectifiers in response to said output of said voltage regulator so as to pass an entire half wave of current excited in the stator winding connected to the respective rectifier whenever said output of said rectifier is in its "on" condition, each of said control circuits comprising pulse transformer (ZTR) in a pulse shaping circuit and having a driving transistor (T11) therefor, said pulse transformer having an output winding (Z3) connected with the control path of one of said semiconductor controlled rectifiers, and also a switching transistor (T13) having its switching path interposed between the switching path of said driving transistor (T11) and the negative pole of said battery and having its control electrode connected with said output of said regulator, and a Schmitt trigger unit (P2) having its output connected to said control electrode of said switching transistor (T13) through a control transistor (12) and having its control input connected with a corresponding one of said stator windings for releasing said switching transistor (13) for control thereof by said output of said voltage regulator quickly at the beginning of every half wave of said corresponding one of said stator windings.

* * * * *